(12) United States Patent
Liu et al.

(10) Patent No.: US 12,381,595 B1
(45) Date of Patent: Aug. 5, 2025

(54) INTERFACE CONVERSION APPARATUS, COMMUNICATION SYSTEM, AND ECHO CANCELLATION METHOD AND APPARATUS

(71) Applicant: Shenzhen Hollyland Technology Co., Ltd., Guangdong (CN)

(72) Inventors: Dezhi Liu, Guangdong (CN); Yi Tian, Guangdong (CN)

(73) Assignee: SHENZHEN HOLLYLAND TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/699,216

(22) PCT Filed: Oct. 8, 2021

(86) PCT No.: PCT/CN2021/122681
§ 371 (c)(1),
(2) Date: Apr. 5, 2024

(87) PCT Pub. No.: WO2023/056609
PCT Pub. Date: Apr. 13, 2023

(51) Int. Cl.
*H04B 3/23* (2006.01)
*H04B 3/493* (2015.01)

(52) U.S. Cl.
CPC .............. *H04B 3/23* (2013.01); *H04B 3/493* (2015.01)

(58) Field of Classification Search
CPC ... H04B 3/02; H04B 3/20; H04B 3/23; H04B 3/231; H04B 3/234; H04B 3/235;
(Continued)

(56) References Cited

U.S. PATENT DOCUMENTS 4,161,633 A * 7/1979 Treiber ................ H04B 3/23
379/253
4,351,060 A * 9/1982 Treiber ................ H04B 1/586
375/230
(Continued)

FOREIGN PATENT DOCUMENTS

| CN | 1248374 A | 3/2000 |
| CN | 1355962 A | 6/2002 |
| CN | 1361973 A | 7/2002 |

OTHER PUBLICATIONS

ISA State Intellectual Property Office of the People's Republic of China, International Search Report Issued in Application No. PCT/CN2021/122681, Jun. 8, 2022, WIPO, 4 pages.
(Continued)

*Primary Examiner* — James M Perez
(74) *Attorney, Agent, or Firm* — The Small Patent Law Group LLC; Christopher R. Carroll

(57) ABSTRACT

Embodiments of the present disclosure provide interface conversion apparatuses, communication systems, and echo cancellation methods and apparatuses. The interface conversion apparatus includes a conversion component, a control component, an impedance matching component and a switch component; a first port of the conversion component connected to a two-wire communication system, a second port of the conversion component selectively connected to the control component or an input end of a four-wire communication system through the switch component, a third port of the conversion component connected to an output end of the four-wire communication system, a fourth port of the conversion component connected to an output end of the impedance matching component, and the impedance matching component connected to the control component.

20 Claims, 8 Drawing Sheets

(58) Field of Classification Search
CPC .......... H04B 3/237; H04B 3/238; H04B 3/32; H04B 3/46; H04B 3/493; H04B 3/487
See application file for complete search history.

(56) References Cited

U.S. PATENT DOCUMENTS

| | | | | | |
|---|---|---|---|---|---|
| 4,381,561 | A * | 4/1983 | Treiber | ............... | H04B 1/586 375/232 |
| 4,486,627 | A * | 12/1984 | Beeman | ............... | H04M 3/30 324/630 |
| 4,639,557 | A * | 1/1987 | Butler | ............... | H04B 3/46 379/29.02 |
| 4,879,738 | A * | 11/1989 | Petro | ............... | H04B 3/20 379/3 |
| 4,953,206 | A * | 8/1990 | Friesen | ............... | H04B 3/32 379/417 |
| 5,204,854 | A * | 4/1993 | Gregorian | ............... | H04B 3/237 370/292 |
| 5,479,439 | A * | 12/1995 | Bowlin | ............... | H04B 3/46 455/67.7 |
| 5,570,029 | A * | 10/1996 | Bottman | ............... | H04B 3/46 324/628 |
| 5,920,834 | A * | 7/1999 | Sih | ............... | H04B 3/23 704/226 |
| 6,177,801 | B1 * | 1/2001 | Chong | ............... | H04M 3/306 324/520 |
| 6,226,322 | B1 * | 5/2001 | Mukherjee | ............... | H04L 25/03878 375/233 |
| 6,282,176 | B1 * | 8/2001 | Hemkumar | ............... | H04M 9/082 379/406.07 |
| 6,765,931 | B1 * | 7/2004 | Rabenko | ............... | H04N 21/4382 370/493 |
| 6,776,637 | B2 * | 8/2004 | Yamada | ............... | H01R 13/74 439/247 |
| 6,868,116 | B2 * | 3/2005 | Ahmad | ............... | H04B 3/23 375/222 |
| 6,912,209 | B1 * | 6/2005 | Thi | ............... | H04B 3/23 370/290 |
| 6,947,478 | B1 * | 9/2005 | Hauptmann | ............... | H04B 3/23 379/406.01 |
| 7,164,708 | B1 * | 1/2007 | Hauptmann | ............... | H04L 27/0002 375/222 |
| 7,358,745 | B1 * | 4/2008 | Lo | ............... | H04L 43/50 324/533 |
| 7,375,532 | B1 * | 5/2008 | Lo | ............... | H04B 3/46 324/543 |
| 7,542,562 | B1 * | 6/2009 | Lorin | ............... | H04M 3/40 379/394 |
| 8,254,561 | B1 * | 8/2012 | McNeill | ............... | H04M 1/6066 379/406.1 |
| 8,351,578 | B2 * | 1/2013 | Elder | ............... | H04M 3/229 379/15.03 |
| 8,401,174 | B1 * | 3/2013 | Whitehouse | ............... | H04B 3/493 379/398 |
| 8,761,350 | B2 * | 6/2014 | Faulkner | ............... | H04L 41/0677 379/1.04 |
| 10,305,192 | B1 * | 5/2019 | Rappaport | ............... | H04B 3/56 |
| 10,326,494 | B2 * | 6/2019 | Rappaport | ............... | H04B 3/46 |
| 10,446,935 | B1 * | 10/2019 | Rappaport | ............... | H01Q 3/30 |
| 10,505,248 | B2 * | 12/2019 | Henry | ............... | H04B 3/52 |
| 10,505,249 | B2 * | 12/2019 | Henry | ............... | H01P 3/06 |
| 10,505,250 | B2 * | 12/2019 | Henry | ............... | H04L 12/2878 |
| 10,505,252 | B2 * | 12/2019 | Stuckman | ............... | H04B 3/56 |
| 10,521,364 | B2 * | 12/2019 | Corbin | ............... | H04N 21/4405 |
| 10,622,722 | B2 * | 4/2020 | Rappaport | ............... | H04B 3/32 |
| 10,623,056 | B1 * | 4/2020 | Bennett | ............... | H04B 3/56 |
| 10,623,057 | B1 * | 4/2020 | Bennett | ............... | H01P 3/16 |
| 10,812,136 | B1 * | 10/2020 | Henry | ............... | H04B 3/36 |
| 10,838,882 | B2 * | 11/2020 | Corbin | ............... | H04N 1/4486 |
| 10,951,267 | B1 * | 3/2021 | Bennett | ............... | H01P 1/16 |
| 11,997,420 | B2 * | 5/2024 | Liu | ............... | H04N 21/43637 |
| 2001/0033583 | A1 * | 10/2001 | Rabenko | ............... | H04N 21/4382 370/429 |
| 2002/0061012 | A1 * | 5/2002 | Thi | ............... | H04L 12/5692 370/352 |
| 2002/0064139 | A1 * | 5/2002 | Bist | ............... | H04B 3/23 370/419 |
| 2002/0176542 | A1 * | 11/2002 | Lazarus | ............... | H04M 3/30 379/3 |
| 2003/0118177 | A1 * | 6/2003 | Karakas | ............... | H04B 3/23 379/406.01 |
| 2004/0052220 | A1 * | 3/2004 | Chen | ............... | H04M 3/002 370/352 |
| 2005/0152385 | A1 * | 7/2005 | Cioffi | ............... | H04M 11/062 370/493 |
| 2006/0251160 | A1 * | 11/2006 | Fazlollahi | ............... | H04B 3/46 375/222 |
| 2008/0187129 | A1 * | 8/2008 | Lu | ............... | H04B 3/237 379/406.01 |
| 2010/0191525 | A1 * | 7/2010 | Rabenko | ............... | H04M 7/125 704/211 |
| 2011/0261949 | A1 * | 10/2011 | Dyba | ............... | H04B 3/23 379/406.08 |
| 2012/0306895 | A1 * | 12/2012 | Faulkner | ............... | H04B 3/46 379/27.01 |
| 2012/0307982 | A1 * | 12/2012 | Faulkner | ............... | H04B 3/46 379/27.01 |
| 2012/0307983 | A1 * | 12/2012 | Faulkner | ............... | H04B 3/46 379/29.1 |
| 2014/0355655 | A1 * | 12/2014 | Chakraborty | ............... | H04B 1/40 375/219 |
| 2018/0159592 | A1 * | 6/2018 | Rappaport | ............... | H04B 3/52 |
| 2020/0052407 | A1 * | 2/2020 | Rappaport | ............... | H01Q 21/205 |
| 2021/0167811 | A1 * | 6/2021 | Henry | ............... | H04B 3/46 |
| 2021/0175927 | A1 * | 6/2021 | Bennett | ............... | H04B 3/46 |
| 2022/0303915 | A1 * | 9/2022 | Bennett | ............... | H04W 52/343 |
| 2023/0368636 | A1 * | 11/2023 | Barnickel | ............... | G08B 21/182 |
| 2023/0421200 | A1 * | 12/2023 | Barnickel | ............... | H04B 3/52 |
| 2025/0150497 | A1 * | 5/2025 | Liu | ............... | H04L 65/765 |

OTHER PUBLICATIONS

ISA State Intellectual Property Office of the People's Republic of China, International Search Report Issued in Application No. PCT/CN2021/122681, Jun. 8, 2022, WIPO, 6 pages. (Submitted with Machine/Partial Translation).

European Patent Office, Extended European Search Report Issued in Application No. 21959701.0, Oct. 8, 2024, Germany, (7 pages).

* cited by examiner

INTERFACE CONVERSION APPARATUS, COMMUNICATION SYSTEM, AND ECHO CANCELLATION METHOD AND APPARATUS

CROSS-REFERENCE TO RELATED APPLICATION

The present application is a U.S. National Stage of International Application No. PCT/CN2021/122681, filed on Oct. 8, 2021, the contents of which are incorporated herein by reference in their entirety.

TECHNICAL FIELD

The present disclosure relates to the field of audio processing technologies, and in particular, to interface conversion apparatuses, communication systems, and echo cancellation methods and apparatuses.

BACKGROUND

When a wireless digital intercom system is connected with a traditional analog two-wire cable communication system, line impedance matching and transceiving isolation need to be carried out, so that an influence of echo signals on a communication line is reduced. In related arts, an analog echo cancellation manner based on a passive hybrid coil or an active circuit, or a digital echo cancellation manner based on adaptive digital filtering is generally adopted. However, the analog echo cancellation manner needs to adjust many parameters, result in high operation complexity; and the digital echo cancellation manner has high processing delay and large computing resource consumption.

SUMMARY

Based on this, embodiments of the present disclosure provide interface conversion apparatuses, communication systems, and echo cancellation methods and apparatuses, to resolve at least some technical problems existing in related arts.

According to a first aspect, an embodiment of the present disclosure provides an interface conversion apparatus, configured to interface a two-wire communication system and a four-wire communication system, including: a conversion component, a control component, an impedance matching component, and a switch component; a first port of the conversion component connected to the two-wire communication system, a second port of the conversion component selectively connected to the control component or an input end of the four-wire communication system through the switch component, a third port of the conversion component connected to an output end of the four-wire communication system, a fourth port of the conversion component connected to an output end of the impedance matching component, and the impedance matching component connected to the control component; when the switch component is switched to connect the second port and the control component, the control component configured to output a test tone signal, detect a first voltage level of the output end of the four-wire communication system, and determine a target impedance parameter of the impedance matching component based on the first voltage level; and when the switch component switched to connect the second port and the input end of the four-wire communication system, the conversion component is configured to implement a signal conversion between the two-wire communication system and the four-wire communication system.

According to the interface conversion apparatus provided by the embodiment of the present disclosure, the first voltage level of the output end of the four-wire communication system is detected through the control component, and the target impedance parameter of the impedance matching component is automatically adjusted based on the first voltage level without manual parameter adjusting, so that an operation complexity in an echo cancellation process is reduced.

Further, the control component is configured to: adjust an initial impedance parameter of the impedance matching component based on the first voltage level until the first voltage level is less than or equal to a preset second threshold, or a number of impedance adjustments reaches a first preset number; and determine the target impedance parameter as an impedance parameter corresponding to any one of following cases: an impedance parameter corresponding to a minimum first voltage level; or an impedance parameter obtained from a last adjustment. In the foregoing manner, the control component can adjust the impedance matching component for multiple times, and select an impedance parameter with a best echo cancellation effect or an impedance parameter obtained by the last adjustment as a final impedance parameter of the impedance matching component.

Further, the control component is configured to: output a signaling tone signal to an input end of the two-wire communication system through the switch component, and detect a second voltage level of the output end of the four-wire communication system; and when the second voltage level is less than or equal to a preset first threshold, determine the target impedance parameter of the impedance matching component based on the first voltage level, where the first threshold is greater than the second threshold.

Further, the control component is further configured to: determine that a cable of the two-wire communication system is not properly connected when the second voltage level is greater than the first threshold. According to the embodiment, a situation that the cable of the two-wire communication system is not properly connected can be automatically checked. When the cable of the two-wire communication system is not properly connected, echo cancellation may not be required, thereby reducing unnecessary resource consumption. Further, indication information may also be output to prompt a user to reconnect to the two-wire communication system in time.

Further, the interface conversion apparatus further includes: a test tone conditioning component, connected between the control component and the switch component, and configured to scale the test tone signal. By adopting the test tone conditioning component, a voltage level of the test tone signal can be consistent with an input voltage level requirement of the conversion component.

Further, the interface conversion apparatus further includes an interaction component connected to the control component; and the control component is further configured to: control the switch component to switch to connect the control component or an input end of the four-wire communication system based on a control signal input by a user through the interaction component. According to this embodiment, the user may trigger the interface conversion apparatus through the interaction component to perform echo cancellation.

Further, the interface conversion apparatus further includes: a digital signal processor, configured to perform adaptive digital echo cancellation; and the second port of the conversion component connected to the switch component through the digital signal processor, and the third port of the conversion component connected to the output end of the four-wire communication system through the digital signal processor. In this embodiment, an analog echo cancellation manner is combined with a digital echo cancellation manner, and because analog echo cancellation has obtained a certain echo loss enhancement, a digital filter with a relatively low order may be used in a digital signal processor to perform digital echo cancellation, thereby ensuring that a relatively high echo loss enhancement can still be obtained while reducing delay and computing resource consumption.

Further, the digital signal processor is further connected to the control component; and the control component is further configured to: determine a target configuration parameter of the digital signal processor.

Further, the control component is configured to: after determining the target impedance parameter of the impedance matching component based on the first voltage level, perform parameter configuration on an initial configuration parameter of the digital signal processor until the first voltage level is less than a third threshold or a number of parameter configurations reaches a second preset number; and determine the target configuration parameter as a parameter corresponding to any one of following cases: a configuration parameter corresponding to a minimum first voltage level; or a configuration parameter obtained by performing parameter configuration last time. In the foregoing manner, the control component can perform multiple parameter configurations on the digital signal processor, and select a configuration parameter with a best echo cancellation effect or a configuration parameter obtained through last adjustment as a final configuration parameter of the digital signal processor.

Further, the interface conversion apparatus further includes: a storage medium, connected to the control component and configured to store an initial impedance parameter of the impedance matching component and an initial configuration parameter of the digital signal processor. In this embodiment, initial values such as an initial impedance parameter and an initial configuration parameter can be stored, and parameter adjustment starts from the initial values, thereby improving parameter adjustment efficiency. The initial value may be a parameter value obtained by previous adjustment, or may be a fixed parameter value.

Further, the interface conversion apparatus further includes: a driving component, connected between the second port of the conversion component and the input end of the four-wire communication system, and configured to amplify a signal output by the second port and output the amplified signal to the input end of the four-wire communication system. Voice signal output by the two-wire communication system can be amplified through the driving component.

Further, the interface conversion apparatus further includes: a receiving component, connected between the third port of the conversion component and the output end of the four-wire communication system, and configured to receive an output signal of the four-wire communication system and send the output signal to the conversion component.

Further, the interface conversion apparatus further includes: a coupling input component, connected between the second port of the conversion component and the input end of the four-wire communication system; and a coupling output component, connected between the third port of the conversion component and the output end of the four-wire communication system. Through the coupling input component and the coupling output component, a matching design of an interface voltage level and input and output impedance can be realized.

Further, the interface conversion apparatus further includes: a configuration and status subpanel, connected to the control component and configured to display a parameter configuration state and a working state of the interface conversion apparatus under control of the control component. The configuration and status subpanel may include some indicator lights for indicating various statuses of the interface conversion apparatus, so as to facilitate user viewing.

According to a second aspect, an embodiment of the present disclosure provides an interface conversion apparatus, including: a conversion component, an impedance matching component, and a digital signal processor; a first port of the conversion component connected to a two-wire communication system, a second port of the conversion component connected to an input end of a four-wire communication system through the digital signal processor, a third port of the conversion component connected to an output end of the four-wire communication system through the digital signal processor, and a fourth port of the conversion component connected to an output end of the impedance matching component; the impedance matching component configured to perform analog echo cancellation; and the digital signal processor configured to perform adaptive digital echo cancellation.

In this embodiment, an analog echo cancellation manner is combined with a digital echo cancellation manner, and because analog echo cancellation has obtained a certain echo loss enhancement, a digital filter with a relatively low order may be used in a digital signal processor to perform digital echo cancellation, thereby ensuring that a relatively high echo loss enhancement can still be obtained while reducing delay and computing resource consumption. In addition, in related arts, the analog echo cancellation manner or the digital echo cancellation manner is independently adopted, and an obtained echo loss enhancement can only reach 20 dB to 30 dB at most, and through a manner of the embodiment, the obtained echo loss enhancement can reach about 50 dB, so that an echo cancellation effect is effectively improved.

According to a third aspect, an embodiment of the present disclosure further provides a communication system, including: a two-wire communication system; a four-wire communication system; and the interface conversion apparatus according to any one of the foregoing embodiments.

According to a fourth aspect, an embodiment of the present disclosure further provides an echo cancellation method, applied to the control component in the interface conversion apparatus according to any embodiment of the first aspect, including: outputting a test tone signal when the switch component is switched to connect the second port of the conversion component and the control component; detecting a first voltage level of an output end of a four-wire communication system; and determining a target impedance parameter of the impedance matching component based on the first voltage level.

Further, determining the target impedance parameter of the impedance matching component based on the first voltage level includes: adjusting an initial impedance parameter of the impedance matching component based on the first voltage level until the first voltage level is less than or equal to a preset second threshold, or a number of impedance adjustments reaches a first preset number; and determining the target impedance parameter as an impedance parameter corresponding to any one of following cases: an impedance parameter corresponding to a minimum first voltage level; or an impedance parameter obtained from a last adjustment.

Further, the method further includes: outputting a signaling tone signal to an input end of a two-wire communication system through the switch component, and detecting a second voltage level of the output end of the four-wire communication system; and when the second voltage level is less than or equal to a preset first threshold, determining the target impedance parameter of the impedance matching component based on the first voltage level, where the first threshold is greater than the second threshold.

Further, the method further includes: determining that a cable of the two-wire communication system is not properly connected when the second voltage level is greater than the first threshold.

Further, the method further includes: controlling the switch component to switch to connect the control component or an input end of the four-wire communication system based on a control signal input by a user through an interaction component.

Further, the method further includes: determining a target configuration parameter of a digital signal processor; where the interface conversion apparatus further includes the digital signal processor, configured to perform adaptive digital echo cancellation; the second port of the conversion component is connected to the switch component through the digital signal processor, and the third port of the conversion component is connected to the output end of the four-wire communication system through the digital signal processor.

Further, determining the target configuration parameter of the digital signal processor includes: after determining the target impedance parameter of the impedance matching component based on the first voltage level, performing parameter configuration on an initial configuration parameter of the digital signal processor until the first voltage level is less than a third threshold or a number of parameter configurations reaches a second preset number; and determining the target configuration parameter as a parameter corresponding to any one of following cases: a configuration parameter corresponding to a minimum first voltage level; or a configuration parameter obtained by performing parameter configuration last time.

Further, the method further includes: reading an initial impedance parameter of the impedance matching component and an initial configuration parameter of the digital signal processor from a storage medium.

According to a fifth aspect, an embodiment of the present disclosure further provides an echo cancellation apparatus, applied to the control component in the interface conversion apparatus according to any embodiment of the first aspect, including: an output module, configured to output a test tone signal when the switch component is switched to connect the second port of the conversion component and the control component; a detecting module, configured to detect a first voltage level of an output end of a four-wire communication system; and a determining module, configured to determine a target impedance parameter of the impedance matching component based on the first voltage level.

According to a sixth aspect, an embodiment of the present disclosure provides a computer-readable storage medium, storing a computer program thereon, the program, when executed by a processor, implementing the method according to any embodiment.

According to a seventh aspect, an embodiment of the present disclosure provides a computer device, including a memory, a processor, and a computer program stored on the memory and executable on the processor, where the processor implements the method according to any embodiment when executing the program.

It should be understood that the above general description and the following detailed description are exemplary and explanatory only, and do not limit the present disclosure.

BRIEF DESCRIPTION OF DRAWINGS

The accompanying drawings, which are incorporated in and constitute a part of the specification, illustrate embodiments consistent with the present disclosure and together with the description serve to explain the technical solutions of the present disclosure.

DETAILED DESCRIPTION

Reference will now be made in detail to exemplary embodiments, examples of which are illustrated in the accompanying drawings. When the following description refers to the accompanying drawings, unless otherwise indicated, the same numbers in different accompanying drawings indicate the same or similar elements. Implementations described in the following exemplary embodiments do not represent all implementations consistent with the present disclosure. Rather, they are merely examples of apparatuses and methods consistent with some aspects of the present disclosure as detailed in the appended claims.

Terms used in the present disclosure are only for a purpose of describing specific embodiments, and are not limiting the present disclosure. Singular forms of "a," said," and "the" used in the present disclosure and in the appended claims are also intended to include majority forms, unless the context clearly indicates otherwise. It should also be understood that the term "and/or" as used herein refers to any or all of the possible combinations containing at least one of the listed items in association. In addition, the term "at least one of" herein refers to any combination of any one of a plurality of items or at least two of any of such items.

It should be understood that although terms first, second, third, etc. may be used to describe various information in the present disclosure, these information should not be limited to these terms. These terms are used only to distinguish the same type of information from one another. For example, without departing from the scope of the present disclosure, first information can also be called second information, and similarly, the second information can also be called the first information. Depending on the context, the word "if" as used herein can be interpreted as "at" or "when" or "in response to determining".

In order to make those skilled in the art better understand the technical solutions in the embodiments of the present disclosure, and make the above objects, features and advantages of the embodiments of the present disclosure more apparent and easier to understand, the technical solutions in the embodiments of the present disclosure will be further described in detail below with reference to the accompanying drawings.

Figure 1:
FIG. 1 is a schematic diagram of an analog cable two-wire intercom system.

A traditional analog cable two-wire intercom system (e.g., party line) adopts a communication mode similar to a traditional analog telephone, usually adopts a pair of transmission lines to transmit and receive duplex analog voices, and transceiving voices on the transmission lines are combined together, so that the system can be called a two-wire transmission (communication) system. A plurality of beltpack terminals 101 coupled to the transmission lines may implement a real-time duplex communication. Moreover, since there is no additional delay problem caused by voice digital processing in an analog communication process, a delay of an echo between sent voices relative to a sidetone between a microphone and an earphone is very small, which has little subjective influence on the communication. An amplitude of echo can be adjusted by a simple linear sidetone amplification and adjustment manner, so as to achieve a better communication experience. The analog cable two-wire intercom system is generally extended and connected in a hand to hand manner, an analog communication master station 102 and beltpacks are connected by a bus cable 103, and a voice extension interface of the analog communication master station 102 is generally called a two-wire interface. A working mode of the analog cable two-wire intercom system is shown in FIG. 1.

In a digital intercom system, especially a wireless digital intercom system, since sending and receiving of digital voices are processed separately, and sending and receiving voices during related mixing are also processed separately, processing delays of several milliseconds to tens of milliseconds are generally introduced for digital processing. A master station end of the digital intercom system generally has a four-wire analog voice interface, and therefore the digital intercom system may be referred to as a four-wire communication system. The "four-wire" here means that sending analog voices occupies two transmission lines, receiving analog voices occupies two transmission lines, and the transmission lines for sending and receiving voices are independent and separate, which is more consistent with a processing mode of receiving and sending separately of the digital system transmission links.

Figure 2:
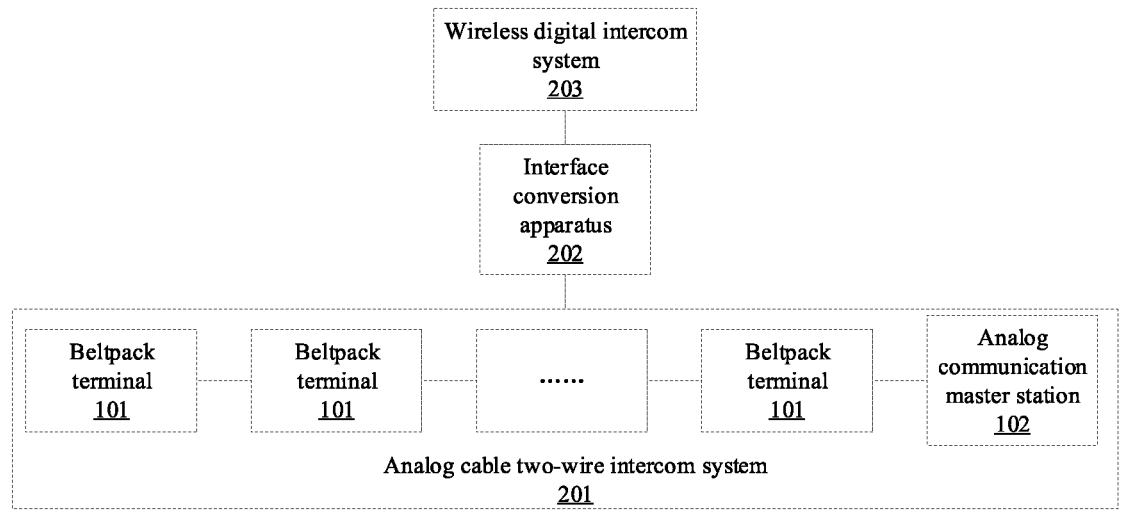
FIG. 2 is a schematic diagram of a 2/4 wire conversion connection manner.

When interfacing the wireless digital intercom system with the traditional analog two-wire cable communication system, it is necessary to convert a four-wire transceiving voice signal of a wireless digital intercom system 203 into a transceiving integrated two-wire voice signal through an interface conversion apparatus 202, thus interfacing with a master station of an analog cable two-wire intercom system 201. That is, two-wire and four-wire conversion (2/4 wire conversion) is performed, and a connection is shown in FIG. 2. The wireless digital intercom system 203 may be a matrix intercom system shown in the figure, or may be other type(s) of communication system.

Figure 3:
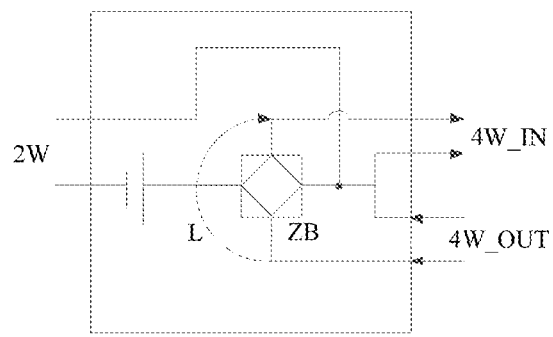
FIG. 3 is a schematic diagram of implementing 2/4 wire conversion using a balance hybrid coil.

A traditional 2/4 wire conversion generally adopts a passive hybrid coil or an active circuit to perform line impedance matching and transceiving isolation. As shown in FIG. 3, it is a schematic diagram of 2/4 wire conversion realized by using a balance hybrid coil, which is a typical way. When an impedance ZB of the balance hybrid coil is well matched with an impedance of a two-wire line 2W, it is possible to realize a well isolation between a four-wire line input end 4W_IN and a four-wire line output end 4W_OUT. If ZB does not match the impedance of the two-wire line well, a voice signal at the four-wire line output end 4W_OUT is easily reflected by the two-wire line 2W to the four-wire line input end 4W_IN, e.g., there is an echo path L between the four-wire line input end 4W_IN and the four-wire line output end 4W_OUT (as shown by a curved arrow in FIG. 3). Moreover, since a relative delay between the four-wire line input end 4W_IN and the four-wire line output end 4W_OUT of a digital intercom system is generally large, when the relative delay is greater than 10 ms, a line echo caused by the line reflection will have a large negative impact on a subjective experience of a communication. Thus, it can be seen that a matching isolation problem of a 2/4 wire conversion circuit is a key factor causing deterioration of a line echo suppression level when interfacing the digital intercom system with the analog intercom system.

Figure 4:
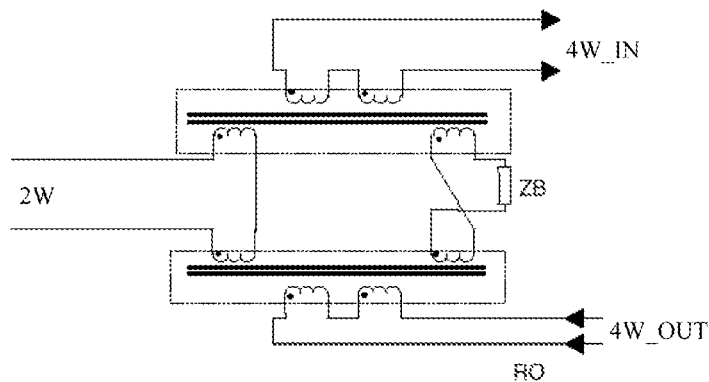
FIG. 4 is a schematic diagram of an interface conversion circuit based on a balance transformer.

Therefore, it is necessary to perform echo cancellation, so as to reduce an influence of line echo on the subjective experience of the communication. In related arts, an analog echo cancellation manner or a digital echo cancellation manner is used to implement echo cancellation. In the analog echo cancellation manner, an interface conversion apparatus with an echo cancellation function is generally designed based on a passive hybrid coil or an active circuit. Taking an interface conversion circuit based on a balance transformer in FIG. 4 as an example, since a length of a bus cable of the two-wire intercom system is not fixed, and the number of beltpack terminals connected to the bus cable is not fixed, a distributed impedance of the two-wire line can be represented as a network with uncertain resistance/inductance/capacitance. To address impedance matching issues, an analog potentiometer to adjust a variable resistance, an adjustable capacitance to adjust a line distributed capacitance, and an adjustable inductance to adjust a distributed inductance are typically reserved, as indicated by ZB in the figure. A tuning process of ZB is very complicated, especially when the number of beltpack terminals connected on the bus cable changes, it is necessary to readjust ZB because of its large influence on the line impedance. When an interface conversion apparatus is designed based on an active circuit, an impedance of a two-wire line is usually matched by manually adjusting a resistance/inductance/capacitance of a feedback amplification branch, so as to achieve an echo cancellation effect.

The above analog echo cancellation manner has the following defects:

(1) The echo cancellation effect is greatly affected by precision of electronic components or parasitic parameters, which is generally limited by a precision level of a component, and an echo return loss enhancement (ERLE) can only reach up to 20 to 30 dB.

(2) Input and output voltage level amplitudes of the four-wire line and the two-wire line generally affect a working state of a driving amplification circuit, thereby affecting an ERLE effect. For example, when the input voltage level of the two-wire line or the four-wire line is too small, a signal-to-noise ratio of a signal is low, and a noise amplitude level affects a cancellation effect of a useful signal. When the input voltage level is too large, the driving amplification circuit generates more nonlinear distortion, and a nonlinear component spectrum bandwidth exceeds a bandwidth capability of a cancellation circuit, which affects the cancellation effect. Therefore, a better echo cancellation effect can be obtained only when the signal amplitude is within a certain range, and the cancellation effect can be affected when the signal amplitude is too large or too small.

(3) A plurality of parameters such as resistance/inductance/capacitance need to be manually tuned, and since the plurality of parameters are correlated with each other, a tuning process is complex.

Figure 5:
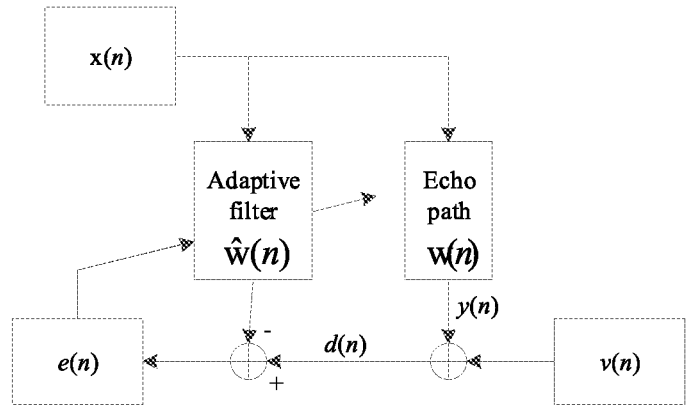
FIG. 5 is a schematic diagram of an adaptive digital echo cancellation manner.

A line echo signal is basically reflected as an amplitude linear transformation signal with time delay characteristics relative to a four-line input signal, and generally, nonlinear distortion is small. For such signals, another general approach is to use digital adaptive filtering as a core digital echo cancellation manner (e.g., adaptive digital echo cancellation). A typical adaptive digital echo cancellation principle block diagram is a linear digital adaptive pre-distortion processing manner shown in FIG. 5, and its core is an adaptive filtering algorithm, such as a least mean square (LMS) error algorithm and a normalized least mean square (NLMS) error algorithm. A processing manner is that an analog communication voice is digitized after being sampled by an analog to digital converter (ADC), then the digitized communication voice is sent to a digital signal processor (DSP) or a central processing unit (CPU) for adaptive digital filtering processing. In the figure, x(n) is a voice signal at a far end, y(n) is an echo signal, w(n) is a channel response of an echo channel, ŵ(n) is a channel response of the echo channel estimated by an adaptive filter, v(n) is a voice signal at a near end, d(n) is a signal obtained after the voice signal at the near end and the echo signal are superimposed, and e(n) is an error.

The digital echo cancellation manner, in a double talk (DT) state, a voice signal at a far end may have a large influence on a filter adaptive coefficient, and usually, a system needs to detect the DT state, and needs to temporarily stop adaptive updating filter coefficients in the DT state. In addition, a cancellation capability of the adaptive filter is related to an adopted filter order, and when the cancellation capability is required to be high, a computing resource consumption will be increased, and meanwhile, a large digital processing delay is brought.

The present disclosure provides interface conversion apparatuses, communication systems, and echo cancellation methods and apparatuses, to resolve at least some of the foregoing technical problems.

Figure 6:
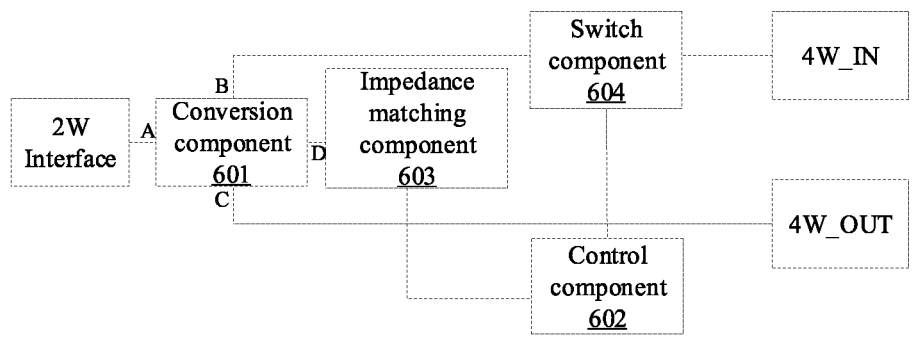
FIG. 6 is a schematic diagram of an interface conversion apparatus according to an embodiment of the present disclosure.

As shown in FIG. 6, an embodiment of the present disclosure provides an interface conversion apparatus, configured to interface with a two-wire communication system and a four-wire communication system, including:

a conversion component 601, a control component 602, an impedance matching component 603, and a switch component 604.

A first port A of the conversion component 601 is connected to the two-wire communication system 2W, a second port B of the conversion component 601 is selectively connected to the control component 602 or an input end 4W_IN of the four-wire communication system through the switch component 604, a third port C of the conversion component 601 is connected to an output end 4W_OUT of the four-wire communication system, a fourth port D of the conversion component 601 is connected to an output end of the impedance matching component 603, and the impedance matching component 603 is connected to the control component 602.

When the switch component 604 is switched to connect the second port B and the control component 602, the control component 602 is configured to output a test tone signal, detect a first voltage level of the output end 4W_OUT of the four-wire communication system, and determine a target impedance parameter of the impedance matching component 603 based on the first voltage level.

When the switch component 604 is switched to connected the second port B and the input end 4W_IN of the four-wire communication system, the conversion component 601 is configured to implement a signal conversion between the two-wire communication system and the four-wire communication system.

An embodiment of the present disclosure adopts an analog echo cancellation manner to perform echo cancellation on echo signal(s) on a communication line. Different from an analog echo cancellation manner in the related arts, the embodiment of the present disclosure does not need to manually adjust impedance parameters, but automatically adjusts the impedance parameters through the control component 602. Since the control component 602 can detect the first voltage level of the output end 4W_OUT of the four-wire communication system, and the first voltage level is positively correlated with an amplitude of an echo signal, the control component 602 can accurately determine an echo suppression condition on the communication line after adjusting the impedance parameter based on a change condition of the first voltage level.

In addition, in a manner of manually tunning the impedance parameters, an echo cancellation effect is greatly affected by parameter discreteness of analog components. The parameter discreteness is mainly affected by precision of balance transformer(s), adjustable capacitor(s), adjustable inductor(s) and adjustable resistor(s), an adjustable minimum step and component aging characteristics. By adopting the closed-loop impedance parameter adjustment manner, the embodiment of the present disclosure can automatically compensate an influence of the parameter discreteness of analog components, so as to acquire a better echo cancellation effect.

In the above embodiment, a function of the conversion component 601 is to convert a sending voice signal and a receiving voice signal using four wires of the four-wire communication system into a two-wire voice signal with integration of both sending and receiving, and then output the two-wire voice signal to the two-wire communication system; and to separate a two-wire voice signal output from the two-wire communication system into an independent sending voice signal and an independent receiving voice signal, and output the independent sending voice signal and the independent receiving voice signal to the four-wire communication system. The conversion component 601 may include a plurality of ports, where the first port A is configured to couple to the two-wire communication system, so as to implement voice signal interaction with the two-wire communication system; the second port B is configured to couple to the input end 4W_IN of the four-wire communication system, so as to input a voice signal output by the two-wire communication system to the four-wire communication system through the input end 4W_IN, and the third port C is configured to couple to the output end 4W_OUT of the four-wire communication system, so as to receive a voice signal output by the four-wire communication system through the output end 4W_OUT. An impedance parameter of the impedance matching component 603 connected to the fourth port D is adjustable, and when an impedance of the two-wire communication system changes, an impedance of the impedance matching component 603 can be matched with the impedance of the two-wire communication system by adjusting the impedance parameter of the impedance matching component 603, thereby achieving an effect of performing echo cancellation on the echo on the communication line.

The control component 602 may be a microcontroller unit (MCU), a CPU, a single-chip microcomputer, or another component having a control function. For example, an MCU model STM32F105RBT6 of ST company may be used as the control component 602.

The interface conversion apparatus may include two modes, one is a calibration mode, and in this mode, the switch component 604 is connected to the second port B and the control component 602, so that the control component 602 can adjust the impedance parameter of the impedance matching component 603 based on a test tone signal. A frequency of the test tone signal can be within a human voice frequency range, for example, the frequency of the test tone signal may be 1 KHz. A digital to analog converter (DAC) is integrated inside the MCU to generate the test tone signal. A DAC output may pass through an external low-pass filter to effectively filter out harmonics. Further, the interface conversion apparatus further includes a test tone conditioning component coupled between the control component and the switch component and configured to scale the test tone signal, so that a voltage level of the test tone signal is satisfied with an input voltage level requirement of the conversion component.

The other is a working mode, in this mode, the switch component 604 connects to the second port B and the input end 4W_IN of the four-wire communication system, so that a voice signal in a normal communication process can be transmitted between the two-wire communication system and the four-wire communication system. In the working mode, the control component 602 stops generating the test tone signal.

The switch component 604 may adopt a single pole double throw (SPDT) analog switch. The switch component 604 may be controlled by the control component 602, so that the switch component 604 switches to connect the second port B with the control component 602, or switches to connect the second port B with the input end 4W_IN of the four-wire communication system. In this case, an enable end of the switch component 604 may be connected to an output control pin of the control component 602, so as to control the switch component 604 to switch by using a control signal output by the output control pin. Or, the switch component 604 may be controlled by other control components having a control function, or manually controlled by a user.

In the embodiment where the control component 602 controls the switch component 604, the interface conversion apparatus may further include an interaction component coupled to the control component, and the control component 602 may control, based on a control signal input by a user through the interaction component, the switch component 604 to connect to the control component 602 or the input end 4W_IN of the four-wire communication system.

The interaction component may include, but is not limited to, various types of components such as a key, a handle, and a knob. The control signal may be generated by operating the interaction component. The control signal may be a voltage level control signal, for example, when the voltage level value of the control signal is a first voltage level value, the switch component 604 is connected to the control component 602, and when the voltage level value of the control signal is a second voltage level value, the switch component 604 is connected to the input end 4W_IN of the four-wire communication system. Or, the control signal may carry identification information, and the control component 602 may parse the identification information. If first identification information is parsed out, the control switch component 604 is connected to the control component 602. If second identification information is parsed out, the control switch component 604 is connected to the input end 4W_IN of the four-wire communication system.

In some embodiments, the control component may adjust an initial impedance parameter of the impedance matching component based on the first voltage level until the first voltage level is less than or equal to a preset second threshold, or the number of impedance adjustments reaches a first preset number. An impedance parameter corresponding to a minimum first voltage level may be determined as a final required target impedance parameter, or an impedance parameter obtained from the last adjustment may be determined as the final required target impedance parameter.

For example, assuming that the impedance adjustment is performed N times in total, a first voltage level after the impedance adjustment is denoted as $\{V_1, V_2, \ldots, V_N\}$, where $V_i$ ($1 \leq i \leq N$) represents a first voltage level after an i-th impedance adjustment is performed. Assuming that $V_k$ is a minimum first voltage level among $V_1, V_2, \ldots, V_N$, an impedance parameter obtained after a k-th impedance adjustment may be determined as the target impedance parameter. Or, $V_N$ may be determined as the target impedance parameter.

In some embodiments, the impedance matching component may include one or more adjustable resistors and one or more adjustable capacitors. Since a resistor is more sensitive than a capacitor, the control component 602 may first adjust resistance(s) of the adjustable resistors and then adjust capacitance(s) of the adjustable capacitors, thereby improving an impedance adjustment efficiency.

Further, the control component may further detect whether a cable of the two-wire communication system is properly connected. Specifically, the control component may output a signaling tone signal to an input end of the two-wire communication system through the switch component 604, and detecting a second voltage level of the output end of the four-wire communication system. If the second voltage level is greater than a preset first threshold, it is determined that the cable of the two-wire communication system is not properly connected. If the second voltage level is less than or equal to the preset first threshold, determining that the cable of the two-wire communication system is properly connected. Determining the target impedance parameter of the impedance matching component based on the first voltage level only when the cable of the two-wire communication system is normally connected. The first threshold is greater than the second threshold.

A frequency of the signaling tone signal may be outside a human speech frequency range, e.g., 24 KHz. A function of the signaling tone signal is to trigger a process of detecting whether the cable of the two-wire communication system is properly connected, and notify a cable beltpack connected to the two-wire communication system to perform a certain agreed operation. For example, the operation "MIC KILL" may be used to mute microphones of all cable beltpacks connected to the two-wire communication system, so as to avoid that in the calibration mode, audio signals generated by the cable beltpack(s) will interfere with test tone signals in a calibration process and affect an accuracy of the calibration process. In some embodiments, the interface conversion apparatus further includes an interaction component, and the control component may output a signaling tone signal based on a control signal input by a user through the interaction component. The interaction component in the embodiments of the present disclosure and the interaction component for controlling the switch component 604 by the control component 602 may be the same interaction component or different interaction components. Further, the signaling tone signal may also be scaled by a conditioning circuit, so that a voltage level of the signaling tone signal is satisfied with an input voltage level requirement of the conversion component.

In some embodiments, the interface conversion apparatus further includes a digital signal processor, the digital signal processor is configured to perform adaptive digital echo cancellation. The second port of the conversion component is connected to the switch component through the digital signal processor, and the third port of the conversion component is connected to the output end of the four-wire communication system through the digital signal processor.

DSP can adopt a DSP processing chip of FM1288 from Fortemedia Company, or adopt other types of DSP. In this embodiment, the DSP analog 4 input/output ports LINE_IN, LINE_OUT, MIC_IN and SPK_OUT, which constitute two uplink and downlink links, and are respectively coupled to corresponding input/output analog circuit modules. The LINE_IN and the LINE_OUT are respectively coupled to the two-wire communication system, the MIC_IN is coupled to the output end of the four-wire communication system, and the SPK_OUT is coupled to the input end of the four-wire communication system.

The digital signal processor is further connected to the control component 602, and the control component 602 is further configured to determine target configuration parameter(s) of the digital signal processor. In some embodiments, the digital signal processor is coupled to the control component 602 through a first communication interface, and the first communication interface may be, for example, an Inter-Integrated circuit (IIC) interface. The digital signal processor may further reserve a second communication interface, such as a universal asynchronous receiver/transmitter (UART) interface, to facilitate debugging connection of an external DSP GUI tool, so as to debug DSP software and related configuration parameters through the DSP GUI tool. The UART interface can communicate with a master computer and receive data required for debugging a DSP software from the master computer.

After determining the target impedance parameter of the impedance matching component based on the first voltage level, the control component 602 may perform parameter configuration on an initial configuration parameter of the digital signal processor until the first voltage level is less than a third threshold or the number of parameter configurations reaches a second preset number; and can determine the target configuration parameter as a parameter corresponding to any one of the following cases: a configuration parameter corresponding to a minimum first voltage level; or a configuration parameter obtained by performing parameter configuration last time. The third threshold in this embodiment is less than the second threshold in the foregoing embodiment.

It is assumed that M parameter configurations are performed in total, and the first voltage level after the parameter configuration is denoted as $\{v_1, v_2, \ldots, v_M\}$, where $v_j$ ($1 \leq j \leq M$) represents a first voltage level after a j-th parameter configuration is performed. Assuming that $v_r$ is a smallest first voltage level among $v_1, v_2, \ldots, v_M$, a configuration parameter obtained after parameter configuration is performed for an r-th time may be determined as the target configuration parameter.

In some embodiments, the interface conversion apparatus further includes a storage medium, coupled to the control component, and the storage medium is configured to store the initial impedance parameter of the impedance matching component and the initial configuration parameter of the digital signal processor. Further, the storage medium may be further configured to store gain configuration information of a communication line, a historical calibration coefficient, a configuration state of a switch, and the like.

Figure 7:
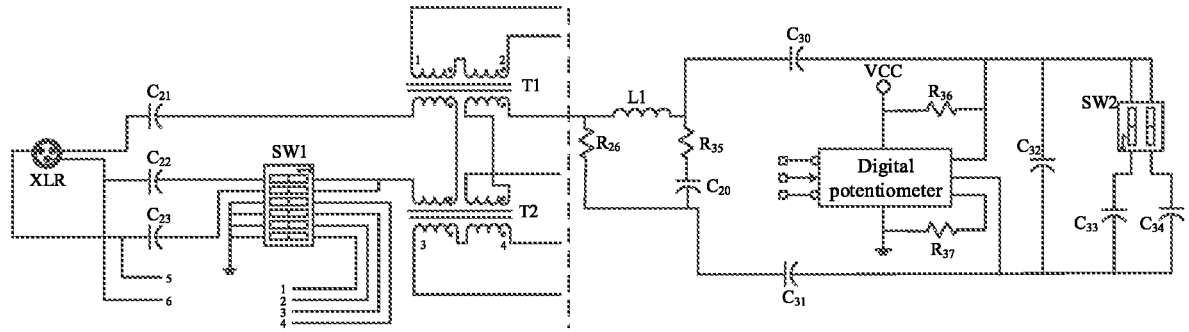
FIG. 7 is a circuit diagram of a conversion component and an impedance matching component according to some embodiments.

As shown in FIG. 7, which is a circuit diagram of the conversion component 601 and the impedance matching component 603 in some embodiments, the circuit adopts an interface conversion apparatus in a form of a 4-winding double-transformer to complete two-four-wire conversion, the conversion component 601 is on a left side of a dotted line, and the impedance matching component 603 is on a right side of the dotted line. Port 1 and port 2 of the transformer T1 are connected to the input end 4W_IN of the four-wire communication system, port 3 and port 4 of the transformer T2 are connected to the output end 4W_OUT of the four-wire communication system. The 4-winding double-transformer can realize two-wire-end signal balance cancellation and is insensitive to input and output impedance. An XLR interface is an interface (e.g., the 2W interface) of a two-wire communication system, and is configured to connect to a two-wire communication system. $C_{20}$, $C_{21}$, $C_{22}$, $C_{23}$, $C_{30}$, $C_{31}$, $C_{32}$, $C_{33}$ and $C_{34}$ can be electrolytic capacitors, L1 is an inductor, and $R_{26}$, $R_{35}$, $R_{36}$ and $R_{37}$ are resistors. Power supply voltages of circuits in the embodiments of the present disclosure are collectively denoted as VCC, but power supply voltages for different circuits and different parts in the same circuit may be the same, or may be different, and specific values of VCC may be set according to actual needs. SW1 and SW2 may be dual inline package switches, which may be controlled by a user, SW1 is configured to select a two-wire audio signal to be single-ended or differential access, SW2 is for a cable length compensation capacitor selection, and an initial value of a cable length corresponding to a compensation network is 50 meters (m). T1 and T2 are audio transformers, and a frequency band satisfies a frequency of 100 Hz to 5 KHz. A digital potentiometer is configured to compensate a direct current (DC) resistance of a cable, and an adjustable resistance range is 1 KΩ, which may be controlled by a control component 602. Considering that a parasitic inductance has less influence on a two-four-wire conversion network, the inductance may not be dynamically compensated. The conversion component 601 may take power from a two-wire line, where pin 6 is a power input pin, and pin 5 is a signal pin and has common ground with the power supply.

In some embodiments, the interface conversion apparatus further includes a driving component, coupled between the second port of the conversion component and the input end of the four-wire communication system, and configured to amplify a signal output by the second port and output the amplified signal to the input end of the four-wire communication system.

Figure 8:
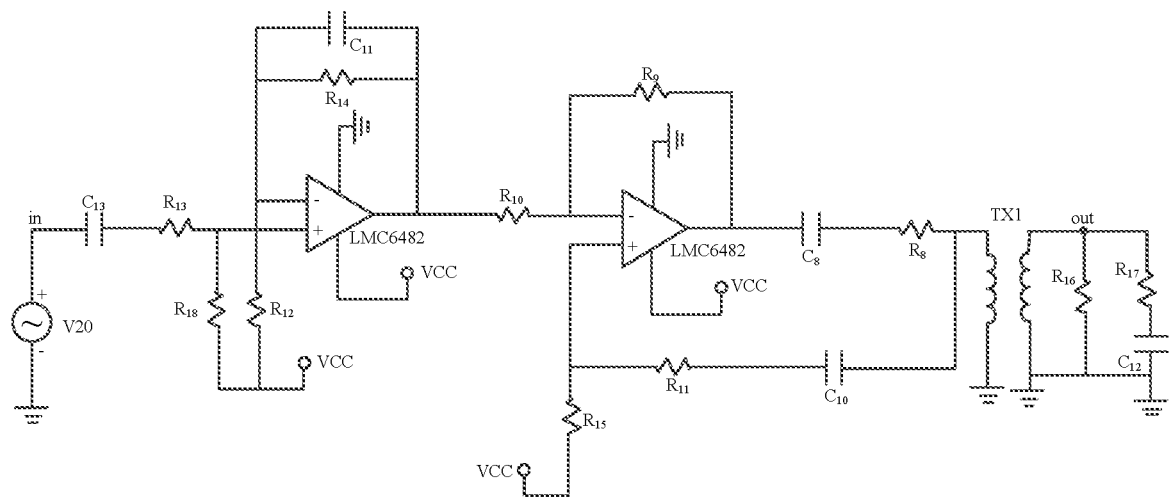
FIG. 8 is a circuit diagram of a driving component according to some embodiments.

The driving component can be externally connected with a master station (base station) of the two-wire communication system, and since a typical two-wire termination impedance of an analog intercom system is generally 200-300 ohms, and there is no influence on a communication of an existing beltpack when the interface conversion apparatus is required to be connected in case that there are multiple beltpacks, a driving part of the driving component is designed as a constant current source with high resistance output, so as to reduce the influence on a line terminal. FIG. 8 is a circuit diagram of a driving component, the driving component is composed of two stages of operational amplifier circuits, a LMC6482 rail-to-rail amplifier may be adopted in the design, a first stage of amplification is voltage amplification, a second stage of amplification is current source output, and a normalized output impedance is above 10 kohm. Where $V_{20}$ is a constant current source, $C_8$, $C_{10}$, $C_{11}$, $C_{12}$, $C_{13}$ are capacitors, $R_8$-$R_{18}$ are resistors, TX may be a balance transformer, VCC is a supply voltage of the circuit, "out" is an output end of the circuit, and "in" is an input end of the circuit.

In some embodiments, the interface conversion apparatus further includes a receiving component, coupled between the third port of the conversion component and the output end of the four-wire communication system, configured to receive an output signal of the four-wire communication system, and send the output signal to the conversion component.

In some embodiments, the interface conversion apparatus further includes a coupling input component connected between the second port of the conversion component and the input end of the four-wire communication system; and a coupling output component connected between the third port of the conversion component and the output end of the four-wire communication system.

Figure 9:
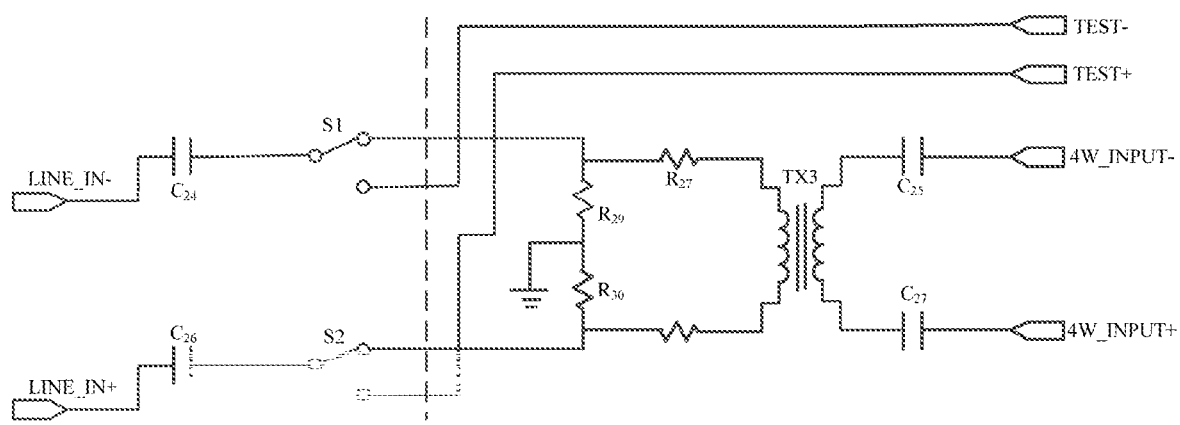
FIG. 9 is a circuit diagram of a coupling input component according to some embodiments.

FIG. 9 is a schematic diagram of a coupling input component. A right side of a dotted line is a coupling input component, and a left side of the dotted line is a switching component. LINE_IN+ and LINE_IN− are respectively a positive electrode and a negative electrode of a LINE_IN port, 4W_INPUT+ and 4W_INPUT− are respectively a positive electrode and a negative electrode of an 4W_INPUT port, and TEST+ and TEST− are respectively a positive electrode and a negative electrode of an output port TEST of a test tone conditioning component. TX3 may be a balance transformer, $C_{24}$-$C_{27}$ are capacitors for implementing DC operating point isolation, $R_{27}$, $R_{29}$ and $R_{30}$ are resistors, and S1 and S2 are single-pole double-throw switches.

In some embodiments, a gain of transmission and reception link of a whole conversion component 601 may be designed as 0 dB, and a normalized input and output power average is 0 dBu. Four-wire input and output signals in the working mode are differential 0 dBu signals, and the circuit is isolated by adopting audio transformers and capacitors. Considering that an input and output of a module can accept an input and output of 18 dBu signals at most, a four-wire input differential amplification gain is set to −16 dB, and an attenuation is 6.4 times.

Figure 10:
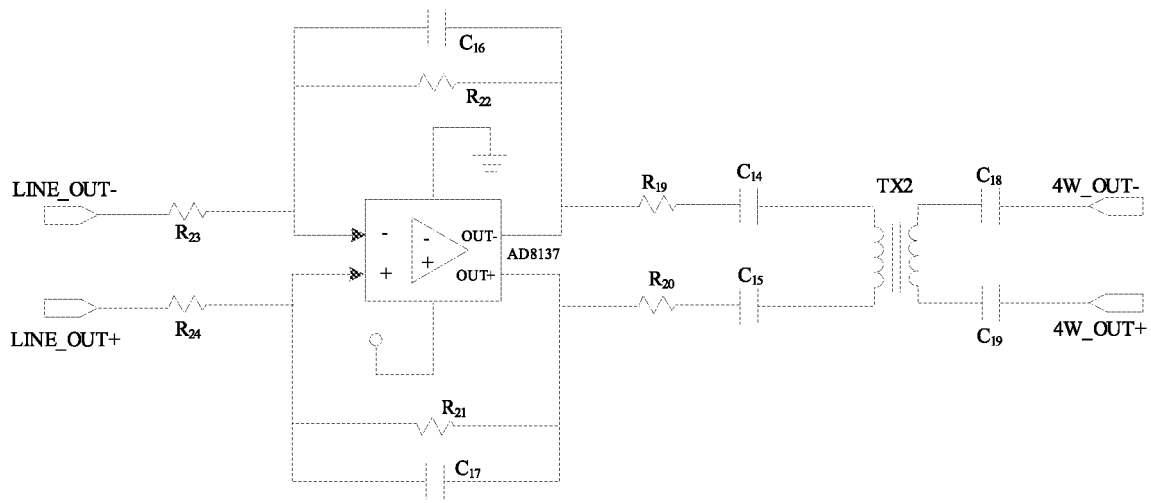
FIG. 10 is a circuit diagram of a coupling output component according to some embodiments.

FIG. 10 is a schematic diagram of a coupling output component. LINE_OUT+ and LINE_OUT− are respectively a positive electrode and a negative electrode of the LINE_OUT port, 4W_OUT+ and 4W_OUT− are respectively a positive electrode and a negative electrode of the 4W_OUT port, AD8137 is a differential amplifier, $C_{14}$-$C_{19}$ are capacitors, $R_{19}$-$R_{24}$ are resistors, and TX2 is a balance transformer. A four-wire output differential amplification gain is designed to be 16 dB, and an amplification is 6.4 times. Considering that a maximum output voltage level is 18 dBu, an amplifier circuit supplies up to 24 V.

It should be noted that various specific values (for example, gain values and voltage values) in the foregoing embodiments are merely exemplary descriptions, and the foregoing specific values may be designed as other values according to actual needs. A value of the gain may be controlled by an amplification factor of the differential amplifier and the driving component. In addition, a specific circuit structure of each functional component in the interface conversion apparatus is not limited to that shown in the figures, circuits of other structures may also be used, and specific models of elements in the circuits and types of interfaces are not limited to the examples in the foregoing embodiments, as long as corresponding functions can be implemented.

Figure 11:
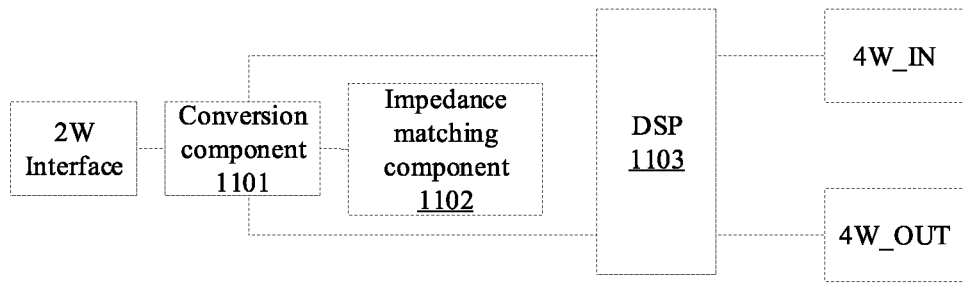
FIG. 11 is a schematic diagram of an interface conversion apparatus according to other embodiments of the present disclosure.

As shown in FIG. 11, an embodiment of the present disclosure further provides an interface conversion apparatus, including:

a conversion component 1101, an impedance matching component 1102, and a digital signal processor (DSP) 1103.

A first port A of the conversion component 1101 is connected to a two-wire communication system 2W, a second port B is connected to an input end 4W_IN of a four-wire communication system through a digital signal processor 1103, a third port C is connected to an output end 4W_OUT of the four-wire communication system through the digital signal processor 1103, and a fourth port D is connected to an output end of the impedance matching component 1102, the impedance matching component 1102 is configured to perform analog echo cancellation, and the digital signal processor 1103 is configured to perform adaptive digital echo cancellation.

In this embodiment, an analog echo cancellation manner is combined with a digital echo cancellation manner, and because analog echo cancellation has obtained a certain echo loss enhancement, a digital filter with a relatively low order may be used in a digital signal processor to perform digital echo cancellation, thereby ensuring that a relatively high echo loss enhancement can still be obtained while reducing delay and computing resource consumption. In addition, in the related arts, the analog echo cancellation manner or the digital echo cancellation manner is independently adopted, and an obtained echo loss enhancement can only reach 20 dB to 30 dB at most, and through a manner of the embodiment, the obtained echo loss enhancement can reach about 50 dB, so that an echo cancellation effect is effectively improved.

In the digital echo cancellation manner in the related arts, in a DT state, because voice signal transmission exists in both a receiving direction and a sending direction, and an echo signal and a remote call voice signal are superimposed together, it is difficult for a DSP to determine and filter out an echo, which causes an abnormal update of an adaptive filter coefficient, so that the update of the adaptive filter coefficient usually needs to be stopped. Adaptive filtering tracking is done only when a single party speaks. According to a solution of the present disclosure, the analog echo cancellation manner and the digital echo cancellation manner are combined, and even if the DSP stops updating the adaptive filter coefficient in the DT state, certain echo loss enhancement can still be obtained through the analog echo cancellation manner, so that an echo cancellation effect in the DT state is improved.

In addition, since the digital echo cancellation manner can provide certain echo loss enhancement, a requirement for a cancellation capability of the analog echo cancellation manner is reduced, and an influence of parameter discreteness of the analog components on the analog echo cancellation manner is reduced.

The impedance parameter of the impedance matching component in the embodiments of the present disclosure may be manually adjusted, or a control component such as an MCU may be set in the interface conversion apparatus and automatically adjusted by the control component. For a detailed description of each component, refer to the foregoing embodiments of the interface conversion apparatus with the control component, and details are not described herein again.

Figure 12:
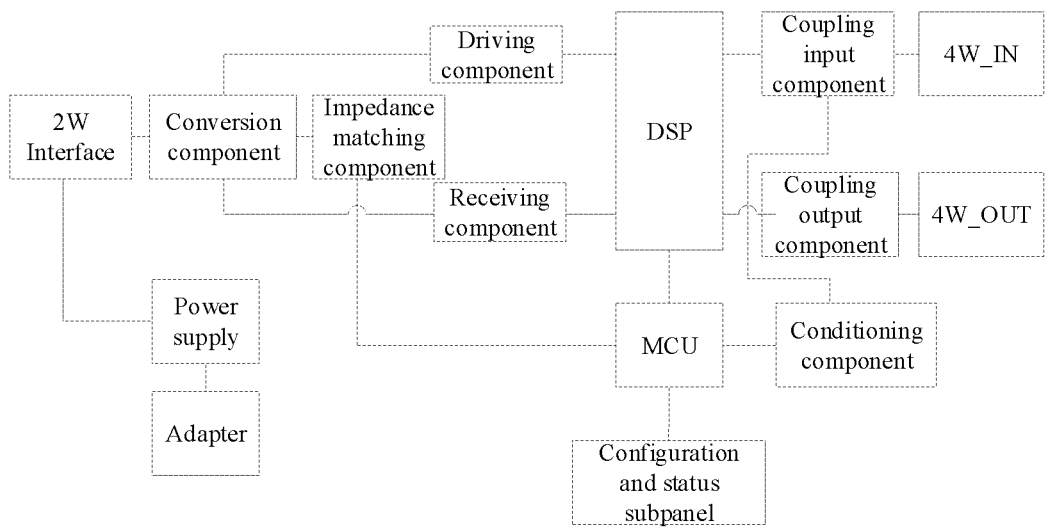
FIG. 12 is a schematic diagram of an interface conversion apparatus according to still other embodiments of the present disclosure.

An overall block diagram of an embodiment of the present disclosure is shown in FIG. 12, in this embodiment, the analog echo cancellation manner is combined with the digital echo cancellation manner, and the impedance parameter of the impedance matching component is automatically adjusted through the MCU in the analog echo cancellation manner. For a detailed description of each component, refer to the foregoing embodiments of the interface conversion apparatus with the control component, and details are not described herein again.

The embodiment of the present disclosure takes into account advantages of the analog echo cancellation manner and the digital echo cancellation manner, and can effectively avoid some defects of the analog echo cancellation manner and the digital echo cancellation manner.

(1) An analog cancellation network with automatic measurement and parameter adjustment control functions utilizes an MCU to generate a calibration signal source (test tone signal), performs source excitation and echo amplitude measurement on a two-wire communication system including an analog two-wire communication terminal, a power supply, a termination resistor and a two-wire connection cable, and meanwhile, the MCU can dynamically adjust resistance/inductance/capacitance (R/L/C) impedance parameters of the impedance matching component, integrate echo measurement and feedback control, and take a minimum echo amplitude as an optimal network matching judgment basis, so that a complexity of manual adjustment can be greatly reduced, an impedance matching precision is improved, and a good echo cancellation effect is obtained.

(2) Due to the fact that a first-stage analog echo cancellation network can obtain a stable cancellation effect of about 30 dB, a cancellation capability requirement of a second-stage digital adaptive filtering cancellation network running on the DSP is not high, a high-order complex filter does not need to be designed, an additional cancellation capability of about 20 dB can be easily achieved, and meanwhile, the delay can be controlled within a lower range.

(3) An analog network and a digital cancellation network are combined for use, so that the parameter discreteness of the analog components in the analog network can be reduced, for example, a cancellation capability fluctuation caused by discreteness of a balance transformer can be reduced, and a total cancellation capability of 50 dB can be ensured in engineering.

Figure 13:
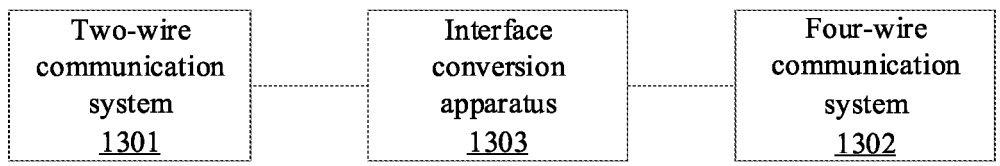
FIG. 13 is a block diagram of a communication system according to an embodiment of the present disclosure.

As shown in FIG. 13, an embodiment of the present disclosure further provides a communication system, including a two-wire communication system 1301, a four-wire communication system 1302, and an interface conversion apparatus 1303. The interface conversion apparatus 1303 may be the interface conversion apparatus in any one of the foregoing embodiments. In practical applications, the communication system may be a duplex intercom system.

Figure 14:
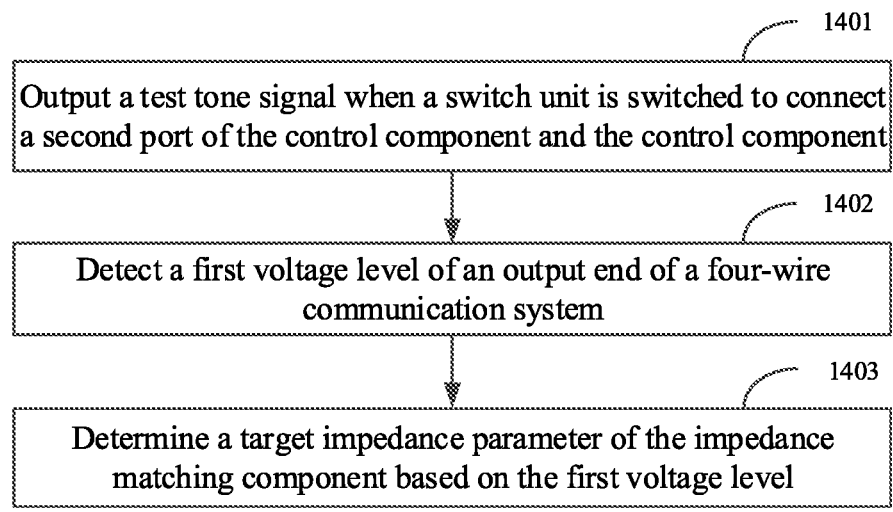
FIG. 14 is a flowchart of an echo cancellation method according to an embodiment of the present disclosure.

As shown in FIG. 14, an embodiment of the present disclosure further provides an echo cancellation method, applied to a control component in the interface conversion apparatus according to any one of the foregoing embodiments, including:

at step 1401, a test tone signal is output when a switch component is switched to connect a second port of the control component and the control component;

at step 1402, a first voltage level of an output end of a four-wire communication system is detected; and at step 1403, a target impedance parameter of the impedance matching component is determined based on the first voltage level.

In some embodiments, determining the target impedance parameter of the impedance matching component based on the first voltage level includes: adjusting an initial impedance parameter of the impedance matching component based on the first voltage level until the first voltage level is less than or equal to a preset second threshold, or a number of impedance adjustments reaches a first preset number; and determining the target impedance parameter as an impedance parameter corresponding to any one of following cases: an impedance parameter corresponding to a minimum first voltage level; or an impedance parameter obtained from a last adjustment.

In some embodiments, the method further includes: outputting a signaling tone signal to an input end of a two-wire communication system through the switch component, and detecting a second voltage level of the output end of the four-wire communication system; and when the second voltage level is less than or equal to a preset first threshold, determining the target impedance parameter of the impedance matching component based on the first voltage level, where the first threshold is greater than the second threshold.

In some embodiments, the method further includes: determining that a cable of the two-wire communication system is not properly connected when the second voltage level is greater than the first threshold.

In some embodiments, the method further includes: controlling the switch component to switch to connect the control component or an input end of the four-wire communication system based on a control signal input by a user through an interaction component.

In some embodiments, the method further includes: determining a target configuration parameter of a digital signal processor; where the interface conversion apparatus further includes the digital signal processor, configured to perform adaptive digital echo cancellation; the second port of the conversion component is connected to the switch component through the digital signal processor, and the third port of the conversion component is connected to the output end of the four-wire communication system through the digital signal processor.

In some embodiments, determining the target configuration parameter of the digital signal processor includes: after determining the target impedance parameter of the impedance matching component based on the first voltage level, performing parameter configuration on an initial configuration parameter of the digital signal processor until the first voltage level is less than a third threshold or a number of parameter configurations reaches a second preset number; and determining the target configuration parameter as a parameter corresponding to any one of following cases: a configuration parameter corresponding to a minimum first voltage level; or a configuration parameter obtained by performing parameter configuration last time.

In some embodiments, the method further includes: reading an initial impedance parameter of the impedance matching component and an initial configuration parameter of the digital signal processor from a storage medium.

Figure 15:
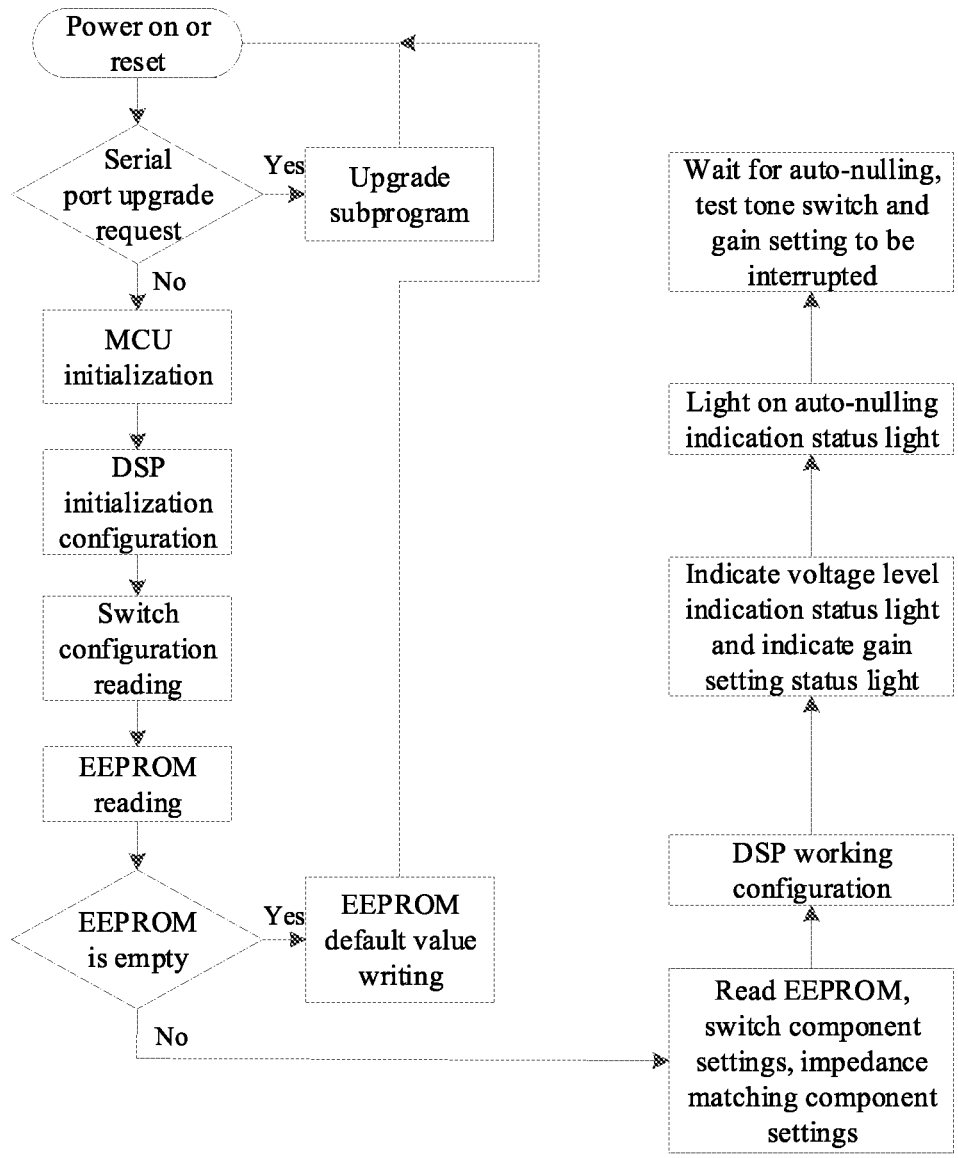
FIG. 15 is an overall working flowchart of a control component according to an embodiment of the present disclosure.

As shown in FIG. 15, FIG. 15 is an overall working flowchart of a control component according to an embodiment of the present disclosure. After the system is powered on, an MCU BOOT first waits for a UART upgrade instruction, and if no upgrade instruction is received, the MCU BOOT starts to switch to an initialization configuration; and if an upgrade instruction is received, the MCU BOOT switches to an upgrade subprogram, and is powered on or reset again after the upgrade is completed. Firstly, MCU initialization is performed, DSP initialization parameter configuration and switch configuration reading are performed, and EEPROM is read. If the EEPROM is empty, a default value is written to the EEPROM, for example, including a default DSP coefficient, a default impedance parameter, and default switch component setting information. Then, the switch component and the impedance matching component are set based on information in the EEPROM, and initialization configuration parameters of a DSP algorithm are configured. After the configuration is completed, a current gain of a communication link can be detected, whether the current gain increases or decreases relative to a default voltage level gain can be compared, and a voltage level indication status light and a gain setting status light can be set based on a difference between the current gain and the default voltage level gain. Then enter an echo auto-nulling phase (echo auto-nulling is echo cancellation), light on an auto-nulling indication status light, and wait for key interruption such as auto-nulling, a test tone switch (e.g., a switch component), and gain setting.

Figure 16:
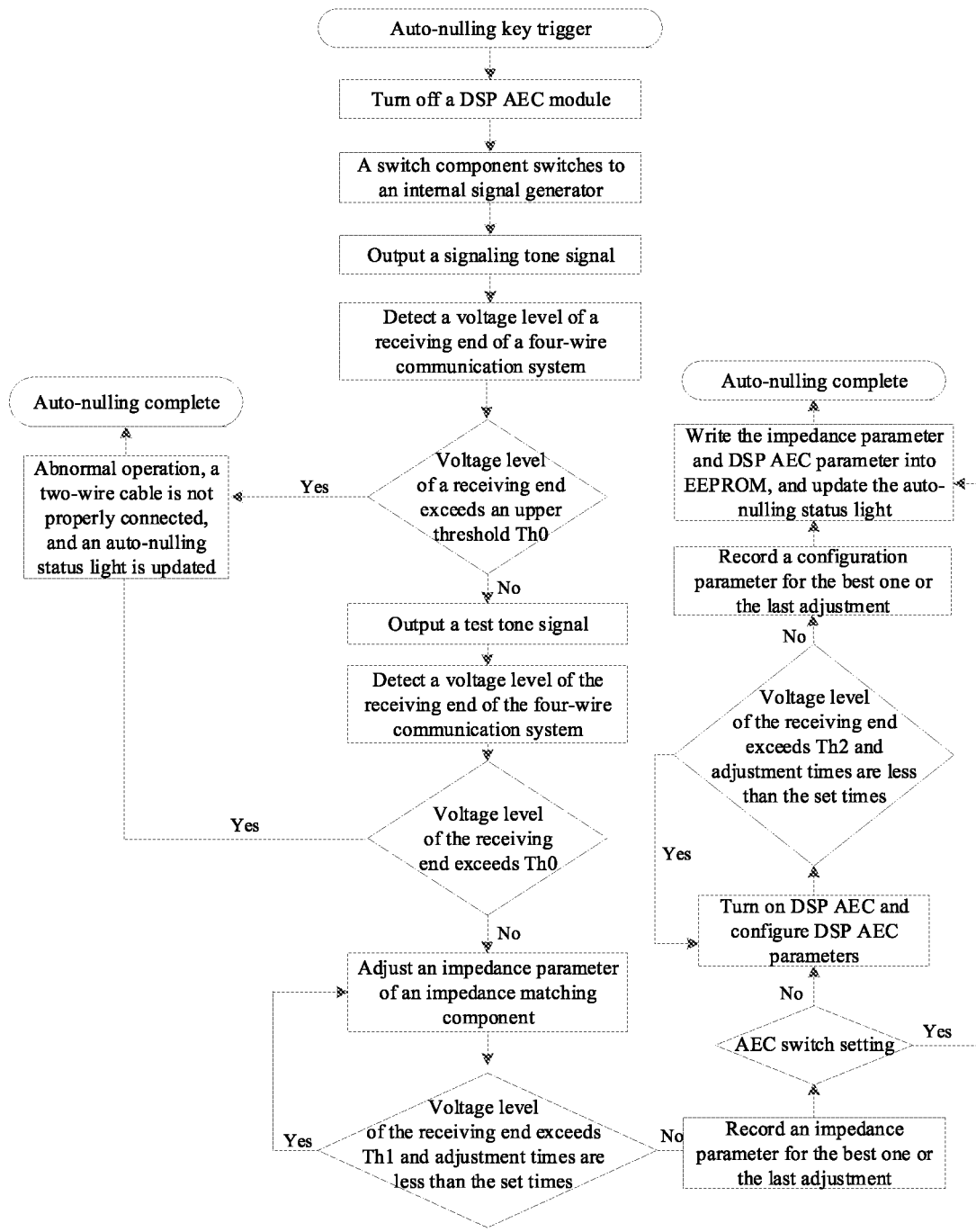
FIG. 16 is an overall schematic diagram of an echo cancellation process according to an embodiment of the present disclosure.

As shown in FIG. 16, FIG. 16 is an overall schematic diagram of an echo cancellation process according to an embodiment of the present disclosure. An auto-nulling core function includes two parts: one part is analog echo cancellation, e.g., impedance parameter adjustment is performed on the impedance matching component; and the other part is DSP digital adaptive filtering parameter optimization and configuration.

First, an MCU generates a test tone signal of 1 KHz and a signaling tone (MIC-KILL) signal of 24 KHz through a DAC. When the system is in a normal working state, a user may press a test tone button and a MIC-KILL button, that is, enter a calibration mode. In the calibration mode, the system automatically turns off an acoustic echo cancellation (AEC) module of a DSP, switches a four-wire input into a test tone signal source (e.g., an internal signal generator), outputs a signaling tone signal and a test tone signal, detects a voltage level of a receiving end of the four-wire communication system, and does not change other working states. The test tone button is pressed again to exit the calibration mode.

An MCU internal timer is interrupted to enable the system to enter a four-wire input/output voltage level indication subprogram, and the system automatically reads digital voltage level indication values corresponding to LINE_IN and LINE_OUT in the DSP, converts the digital voltage level indication values into root mean square (RMS) levels, and updates states of corresponding voltage level indicator lights in real time. The input/output voltage level indicates that calibration is performed in a single board debugging phase, so as to calibrate discreteness of analog components.

An auto-nulling process is specifically as follows: firstly, a signaling tone signal is output, and if the voltage level of the receiving end exceeds a first threshold Th0, it indicates that a two-wire cable is not properly connected, so that an auto-nulling indicator light can be directly updated. If the voltage level of the receiving end does not exceed the first threshold Th0, it indicates that the two-wire cable has been properly connected, a test tone signal may be output, and the voltage level of the receiving end of the four-wire communication system is detected again. Similarly, if the voltage level of the receiving end exceeds the first threshold Th0, it indicates that the two-wire cable is not properly connected. If the voltage level of the receiving end does not exceed the first threshold Th0, an impedance parameter of an impedance matching component is adjusted. Here, multiple adjustments may be performed until the voltage level of the receiving end does not exceed a second threshold Th1 or the number of adjustments reaches a set number of times. An impedance parameter for the best one (the one with the smallest voltage level) or the last adjustment may be recorded.

Then, it is determined whether an AEC switch setting is disabled (configuration parameter(s) of the AEC module cannot be configured when disabled). If yes, the impedance parameter of the impedance matching component and the configuration parameter of the AEC module are directly written into the EEPROM, and the auto-nulling indicator light is updated. If the AEC switch setting is not disabled, the AEC module is turned on and configuration parameter(s) of the AEC module are configured. Here, multiple configurations may be performed until the voltage level of the receiving end does not exceed a third threshold Th3 or the number of adjustments reaches a set number of times. In the above embodiment, Th0>Th1>Th2. A configuration parameter obtained from the best one (the one with the smallest voltage level) or the last configuration may be recorded. Finally, the impedance parameter of the impedance matching component and the configuration parameter(s) of the AEC module are written into the EEPROM, and the auto-nulling indicator light is updated.

The present disclosure mainly solves the problem of line echo cancellation caused by cascade of a four-wire analog communication interface of a digital intercom system and a traditional analog two-wire intercom system. According to the present disclosure, an auto-nulling analog cancellation network and a DSP digital adaptive filtering echo cancellation technology are adopted at the same time, the characteristics of the auto-nulling analog cancellation network and the DSP digital adaptive filtering echo cancellation technology can be fully exerted, a whole nulling process is automatically completed by one key, an echo cancellation effect not lower than 50 dB can be stably obtained, the method can automatically adapt to a length of a two-wire cable and the number of analog communication terminals, a use process is simple and convenient, the cancellation effect is reliable and stable, and the complexity of on-site cancellation debugging work can be greatly reduced. Moreover, the design can effectively reduce an adverse effect of parameter discreteness of analog components in the circuit, in addition, the system delay can be smaller than 10 ms, good performance can be obtained, and the cost can be effectively controlled.

A person skilled in the art may understand that, in the foregoing method in the detailed description, a writing order of steps does not mean a strict execution order and does not impose any limitation on the implementation process, and a specific execution order of steps should be determined based on functions and possible internal logic of the steps.

Figure 17:
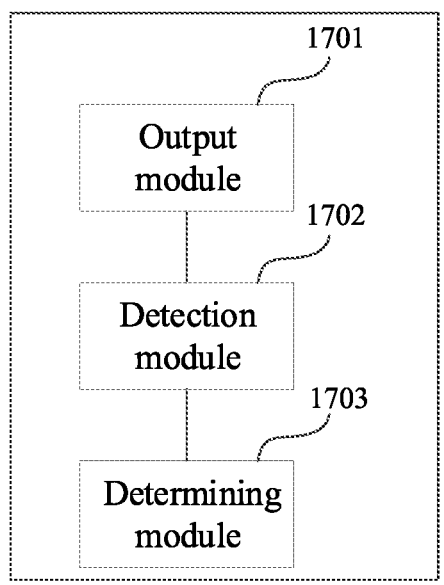
FIG. 17 is a block diagram of an echo cancellation apparatus according to an embodiment of the present disclosure.

As shown in FIG. 17, an embodiment of the present disclosure further provides an echo cancellation apparatus, applied to the control component in the interface conversion apparatus according to any one of the foregoing embodiments, where the apparatus includes:

an output module 701, configured to output a test tone signal when the switch component is switched to connect the second port of the conversion component and the control component;

a detection module 1702, configured to detect a first voltage level of an output end of a four-wire communication system; and a determining module 1703, configured to determine a target impedance parameter of the impedance matching component based on the first voltage level.

In some embodiments, a function of the apparatus provided in the embodiments of the present disclosure or a module included in the apparatus may be configured to perform the method described in the foregoing method embodiments, and for specific implementation thereof, reference may be made to the description in the foregoing method embodiments, and details are not described herein again for brevity.

An embodiment of the present disclosure further provides a computer-readable storage medium, storing a computer program thereon, the computer program, when executed by a processor, implementing the method according to any one of the foregoing embodiments.

The computer-readable storage medium, including both permanent and non-permanent, removable and non-removable media, may be implemented by any method or technology for information storage. The information may be computer-readable instructions, data structures, modules of a program, or other data. Examples of storage media for a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic disk storage or other magnetic storage devices, or any other non-transmission medium that can be used to store information that can be accessed by a computing device. As defined herein, the computer-readable medium does not include transitory media, such as modulated data signals and carrier waves.

It can be seen from the description of the above embodiments that those skilled in the art can clearly understand that the embodiments of the present specification can be implemented by means of software plus a necessary universal hardware platform. Based on such understanding, the technical solutions of the embodiments of the present specification essentially or the part contributing to the related art may be embodied in the form of a software product, and the computer software product may be stored in a storage medium, such as a ROM/RAM, a magnetic disk, an optical disk, and the like, and includes several instructions for enabling a computer device (which may be a personal computer, a server, or a network device, etc.) to execute the method described in each embodiment or some parts of the embodiments of this specification.

The system, apparatus, module, unit or component illustrated in the above embodiments may be specifically implemented by a computer chip or an entity, or implemented by a product having a certain function. A typical implementation device is a computer, and a specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any one of these devices.

The embodiments in this specification are described in a progressive manner, the same and similar parts between the embodiments may refer to each other, and each embodiment focuses on differences from other embodiments. In particular, for the apparatus embodiments, since they are substantially similar to the method embodiments, the description is relatively simple, and reference may be made to some descriptions of the method embodiments for related parts. The apparatus embodiments described above are merely illustrative, the modules described as separate components may or may not be physically separate, and functions of the modules may be implemented in one or more pieces of software and/or hardware when implementing the solutions in the embodiments of this specification. Some or all of the modules may also be selected according to actual needs to achieve the objective of the solutions of the embodiments. Those skilled in the art can, without creative efforts, understand and implement.

The above description is only a specific implementation of the embodiments of this specification, and it should be noted that those skilled in the art can make several improvements and modifications without departing from the principle of the embodiments of this specification, and these improvements and modifications should also be regarded as the protection scope of the embodiments of this specification.

The invention claimed is:

1. An interface conversion apparatus, configured to interface with a two-wire communication system and a four-wire communication system, comprising:

a conversion component, a control component, an impedance matching component, and a switch component;

a first port of the conversion component connected to the two-wire communication system, a second port of the conversion component selectively connected to the control component or an input end of the four-wire communication system through the switch component, a third port of the conversion component connected to an output end of the four-wire communication system, a fourth port of the conversion component connected to an output end of the impedance matching component, and the impedance matching component connected to the control component;

when the switch component is switched to connect the second port and the control component, the control component configured to output a test tone signal, detect a first voltage level of the output end of the four-wire communication system, and determine a target impedance parameter of the impedance matching component based on the first voltage level; and when the switch component is switched to connect the second port and the input end of the four-wire communication system, the conversion component configured to implement a signal conversion between the two-wire communication system and the four-wire communication system.

2. The interface conversion apparatus according to claim 1, wherein the control component is configured to:

adjust an initial impedance parameter of the impedance matching component based on the first voltage level until the first voltage level is less than or equal to a preset second threshold, or a number of impedance adjustments reaches a first preset number; and determine the target impedance parameter as an impedance parameter corresponding to any one of following cases:

an impedance parameter corresponding to a minimum first voltage level; or an impedance parameter obtained from a last adjustment.

3. The interface conversion apparatus according to claim 2, wherein the control component is configured to:

output a signaling tone signal to an input end of the two-wire communication system through the switch component, and detect a second voltage level of the output end of the four-wire communication system; and when the second voltage level is less than or equal to a preset first threshold, determine the target impedance parameter of the impedance matching component based on the first voltage level, wherein the first threshold is greater than the second threshold.

4. The interface conversion apparatus according to claim 3, wherein the control component is further configured to:

determine that a cable of the two-wire communication system is not properly connected when the second voltage level is greater than the first threshold.

5. The interface conversion apparatus according to claim 1, further comprising:

a test tone conditioning component, connected between the control component and the switch component, and configured to scale the test tone signal.

6. The interface conversion apparatus according to claim 1, wherein the interface conversion apparatus further comprises an interaction component connected to the control component; and the control component is further configured to:

control the switch component to switch to connect the control component or the input end of the four-wire communication system based on a control signal input by a user through the interaction component.

7. The interface conversion apparatus according to claim 1, further comprising:

a digital signal processor, configured to perform adaptive digital echo cancellation;

the second port of the conversion component connected to the switch component through the digital signal processor, and the third port of the conversion component connected to the output end of the four-wire communication system through the digital signal processor;

wherein the digital signal processor is further connected to the control component; and the control component is further configured to:

determine a target configuration parameter of the digital signal processor.

8. The interface conversion apparatus according to claim 7, wherein the control component is configured to:

after determining the target impedance parameter of the impedance matching component based on the first voltage level, perform parameter configuration on an initial configuration parameter of the digital signal processor until the first voltage level is less than a third threshold or a number of parameter configurations reaches a second preset number; and determine the target configuration parameter as a parameter corresponding to any one of following cases:

a configuration parameter corresponding to a minimum first voltage level; or a configuration parameter obtained by performing parameter configuration last time.

9. The interface conversion apparatus according to claim 7, further comprising:

a storage medium, connected to the control component and configured to store an initial impedance parameter of the impedance matching component and an initial configuration parameter of the digital signal processor.

10. The interface conversion apparatus according to claim 1, further comprising:

a driving component, connected between the second port of the conversion component and the input end of the four-wire communication system, and configured to amplify a signal output by the second port and output the amplified signal to the input end of the four-wire communication system.

11. The interface conversion apparatus according to claim 1, further comprising:

a receiving component, connected between the third port of the conversion component and the output end of the four-wire communication system, and configured to receive an output signal of the four-wire communication system and send the output signal to the conversion component.

12. The interface conversion apparatus according to claim 1, further comprising:

a coupling input component, connected between the second port of the conversion component and the input end of the four-wire communication system; and a coupling output component, connected between the third port of the conversion component and the output end of the four-wire communication system.

13. The interface conversion apparatus according to claim 1, further comprising a configuration and status subpanel, connected to the control component and configured to display a parameter configuration state and a working state of the interface conversion apparatus under control of the control component.

14. A communication system, comprising:

a two-wire communication system;

a four-wire communication system; and an interface conversion apparatus, wherein the interface conversion apparatus is configured to interface with the two-wire communication system and the four-wire communication system, and the interface conversion apparatus comprises:

a conversion component, a control component, an impedance matching component, and a switch component;

a first port of the conversion component connected to the two-wire communication system, a second port of the conversion component selectively connected to the control component or an input end of the four-wire communication system through the switch component, a third port of the conversion component connected to an output end of the four-wire communication system, a fourth port of the conversion component connected to an output end of the impedance matching component, and the impedance matching component connected to the control component;

when the switch component is switched to connect the second port and the control component, the control component configured to output a test tone signal, detect a first voltage level of the output end of the four-wire communication system, and determine a target impedance parameter of the impedance matching component based on the first voltage level; and when the switch component is switched to connect the second port and the input end of the four-wire communication system, the conversion component configured to implement a signal conversion between the two-wire communication system and the four-wire communication system.

15. An echo cancellation method, performed by a control component in an interface conversion apparatus, wherein the interface conversion apparatus further comprises a conversion component, an impedance matching component, and a switch component, a first port of the conversion component is connected to the two-wire communication system, a second port of the conversion component is selectively connected to the control component or an input end of the four-wire communication system through the switch component, a third port of the conversion component is connected to an output end of the four-wire communication system, a fourth port of the conversion component is connected to an output end of the impedance matching component, and the impedance matching component is connected to the control component, and the method comprises:

outputting a test tone signal when the switch component is switched to connect the second port of the conversion component and the control component;

detecting a first voltage level of an output end of a four-wire communication system; and determining a target impedance parameter of the impedance matching component based on the first voltage level.

16. The method according to claim 15, wherein determining the target impedance parameter of the impedance matching component based on the first voltage level comprises:

adjusting an initial impedance parameter of the impedance matching component based on the first voltage level until the first voltage level is less than or equal to a preset second threshold, or a number of impedance adjustments reaches a first preset number; and determining the target impedance parameter as an impedance parameter corresponding to any one of following cases:

an impedance parameter corresponding to a minimum first voltage level; or an impedance parameter obtained from a last adjustment.

17. The method according to claim 16, further comprising:

outputting a signaling tone signal to an input end of a two-wire communication system through the switch component, and detecting a second voltage level of the output end of the four-wire communication system;

when the second voltage level is less than or equal to a preset first threshold, determining the target impedance parameter of the impedance matching component based on the first voltage level, wherein the first threshold is greater than the second threshold; and determining that a cable of the two-wire communication system is not properly connected when the second voltage level is greater than the first threshold.

18. The method according to claim 15, further comprising:

controlling the switch component to switch to connect the control component or an input end of the four-wire communication system based on a control signal input by a user through an interaction component.

19. The method according to claim 15, further comprising:

determining a target configuration parameter of a digital signal processor;

wherein the interface conversion apparatus further comprises the digital signal processor, configured to perform adaptive digital echo cancellation; the second port of the conversion component is connected to the switch component through the digital signal processor, and the third port of the conversion component is connected to the output end of the four-wire communication system through the digital signal processor;

wherein determining the target configuration parameter of the digital signal processor comprises:

after determining the target impedance parameter of the impedance matching component based on the first voltage level, performing parameter configuration on an initial configuration parameter of the digital signal processor until the first voltage level is less than a third threshold or a number of parameter configurations reaches a second preset number; and determining the target configuration parameter as a parameter corresponding to any one of following cases:

a configuration parameter corresponding to a minimum first voltage level; or a configuration parameter obtained by performing parameter configuration last time.

20. The method according to claim 19, further comprising:

reading an initial impedance parameter of the impedance matching component and an initial configuration parameter of the digital signal processor from a storage medium.

* * * * *